United States Patent
Hayes

(10) Patent No.: US 7,178,955 B2
(45) Date of Patent: Feb. 20, 2007

(54) SAFETY HEADLIGHT

(75) Inventor: Henry David Hayes, Santa Cruz, CA (US)

(73) Assignee: Bell Sports, Inc., Santa Cruz, CA (US)

( * ) Notice: Subject to any disclaimer, the term of this patent is extended or adjusted under 35 U.S.C. 154(b) by 15 days.

(21) Appl. No.: 10/706,743

(22) Filed: Nov. 12, 2003

(65) Prior Publication Data

US 2005/0099787 A1    May 12, 2005

(51) Int. Cl.
*B62J 6/00*    (2006.01)

(52) U.S. Cl. ............... 362/475; 362/183; 362/251; 362/800

(58) Field of Classification Search ........ 362/473–476, 362/183, 184, 194, 251, 642, 464, 276, 243, 362/255, 800, 802, 77; 315/185–193, 200–208, 315/149–159, 312–325
See application file for complete search history.

(56) References Cited

U.S. PATENT DOCUMENTS

| | | | |
|---|---|---|---|
| 3,529,147 A | 9/1970 | Badalich | 240/37 |
| 4,255,746 A * | 3/1981 | Johnson et al. | 340/577 |
| 4,290,095 A * | 9/1981 | Schmidt | 362/191 |
| 4,985,813 A | 1/1991 | Putman | 362/186 |
| 5,641,220 A | 6/1997 | Sutherland et al. | 362/72 |
| 5,690,410 A | 11/1997 | Lin | 362/72 |
| 5,797,672 A | 8/1998 | Dobert | 362/190 |
| 5,806,961 A | 9/1998 | Dalton et al. | 362/183 |
| 6,017,140 A * | 1/2000 | Chou | 362/475 |
| 6,095,661 A * | 8/2000 | Lebens et al. | 362/184 |
| 6,286,976 B1 * | 9/2001 | Chopra et al. | 362/183 |
| 6,394,622 B1 | 5/2002 | Macek | 362/228 |
| 2001/0053077 A1 | 12/2001 | Anwly-Davies et al. | 362/184 |
| 2003/0067769 A1 * | 4/2003 | Gilpin | 362/184 |

* cited by examiner

*Primary Examiner*—Renee Luebke
*Assistant Examiner*—Gunyoung T. Lee
(74) *Attorney, Agent, or Firm*—Womble Carlyle Sandridge & Rice

(57) ABSTRACT

A safety headlight with a battery power monitor is provided. The headlight includes one primary light bulb and at least one LED bulb. When the battery power begins to fade so that the primary bulb is in danger of going out, a sensor in the headlight switches power to the LED bulb(s) to provide safety lighting so that the headlight user can be seen by others. The safety headlight is typically used by cyclists riding before sunrise or after sunset. The headlight permits the cyclists to see the road surface and provides notice to other motorists of the cycle's presence.

15 Claims, 8 Drawing Sheets

SAFETY HEADLIGHT

THE FIELD OF THE INVENTION

The present invention relates to a safety headlight with a battery power monitor. The headlight includes one light bulb and at least one Light Emitting Diode (LED) bulb. When available battery power fades to a certain preset level, a sensor in the headlight switches power to the LED bulb(s) to provide safety lighting for an extended period of time so that others can see the headlight user.

DESCRIPTION OF THE RELATED ART

The safety headlight described herein will typically be used by cyclists, but pedestrians could also utilize the safety headlight. The safety headlight is designed specifically to fulfill the needs of a cyclist riding before sunrise or after sunset. The headlight permits a cyclist to see the road surface and provides notice to other motorists of the cycle's presence. In fact, in the United States, riding at night with a headlight is a legal requirement in all states.

The prior art includes several safety lighting devices. For example, Badalich, U.S. Pat. No. 3,529,147, provides a lamp turret assembly that utilizes a primary lamp and provides a spare lamp that can be placed into position for use. Putman, U.S. Pat. No. 4,985,813, provides a light for emergency use in the form of a sphere and that provides continuous, intermittent, or delayed operation. Lin, U.S. Pat. No. 5,690,410, provides a light device for a bicycle that includes a microprocessor capable of actuating two light bulbs of different wattages where the light bulb of lower wattage may be energized when the bicycle is stopped. A manual switch is included in the Lin light device coupled to the microprocessor for selecting between the two light bulbs.

Sutherland, et al., U.S. Pat. No. 5,641,220, provides a portable headlamp for bicycles that is removable and mountable. Dobert, U.S. Pat. No. 5,797,672, provides a safety light that utilizes an array of ultra bright LED bulb(s) and that is capable of replacing non-functioning vehicle tail or marker lights or is capable of use as a warning or emergency light for stationary applications. Dalton, et al., U.S. Pat. No. 5,806,961, provides a rechargeable flashlight assembly with a night light that acts as a locating device for the flashlight and that is disconnectable when the electrical connector is in a retracted position. Macek, U.S. Pat. No. 6,394,622, provides a multiple weapon self-defense unit that includes a flashlight, a strobe light source, and a pair of spaced electrode prongs.

Anwly-Davies, et al., U.S. Patent Application Publication No. U.S. 2001/0053077A1, provides an electronic torch for use as a bicycle lamp that houses a filament bulb and at least one LED that may be arranged in line with one another or side by side. The user may manually select between the filament bulb and the LED bulb(s). For example, on dark streets, the user may manually select a filament bulb to provide a bright beam of light by which the user can see. On lighted streets, the user may manually select the LED, which provides sufficient light for oncoming cars to see the user's bicycle.

Chou, U.S. Pat. No. 6,017,140, provides a multi-functional bicycle lamp that includes a switch, a microprocessor, a lamp bulb, and a plurality of light emitting diodes. The Chou patent teaches that a bicycle light with a manual switch can be used to switch between a filament bulb and a set of LED hazard lights located on the sides of the light.

Thus, there are shortcomings in the prior art as noted above. Specifically, the prior art fails to disclose an adequate lighting device for a cyclist that will provide illumination and safety while monitoring available battery power.

SUMMARY OF THE INVENTION

Briefly described, the safety headlight disclosed herein senses available battery power and is capable of switching power from a primary, filament or incandescent light bulb to at least one LED bulb. The safety headlight operates the user-selected light bulb to emit a bright light beam while available battery power is sufficient to support primary bulb operation. This primary light source provides notice visibility of the cyclist to oncoming traffic and visibility of the ridden path for a cyclist utilizing the safety headlight. When the battery power begins to wane and the power output drops below a specified level, the safety headlight includes a light logic switch that automatically switches from the primary bulb to the LED bulb(s) and thus allows the remaining power from the batteries to operate the LED bulb(s). The primary bulb in this instance now receives no power (off) and the LED bulb(s) are receiving full power (on). The switch time between bulb and LED bulb(s) is immediate so that the light does not turn off. The LED bulb(s) typically provide white or yellow light and are bright enough to maintain the legal requirements for a cycle headlight. Additionally, the LED bulb(s) are mounted in the front lens cabinet along side the central bulb facing forward and are visible from both the front of the cycle and from either side.

The residual power of the batteries should be sufficient to support LED bulb(s) operation for a substantially longer time than the primary bulb. The LED bulb(s) operation has been estimated to be more than 20 hours for a typical bicycle headlight and battery power source.

Additionally, the safety headlight can include a low battery indicator and can include a mode light to indicate the current mode of operation.

Once the light has switched to operate the LED bulb(s), a user can at any time override the automatic function and return to a dimming primary bulb by engaging a switch in a certain manner. For example, the cyclist can engage the switch for a certain length of time, press the switch a certain number of times, or any other method of overriding the automatic switching. This overriding feature allows cyclists in low light conditions or cyclists using the light for emergency repairs to cast as much light as possible for as long as the batteries will power the primary light.

The safety light described herein typically includes a housing containing a power source with an available power, a primary bulb that operates with a first power and at least one LED bulb that operates with a second power lower than the first power, and a sensor connected to the power source, the primary bulb, and the LED bulb(s). When the sensor described herein determines that the available power is inadequate to supply the first power, the sensor switches the safety light from operation of the primary bulb to operation of the LED bulb(s).

BRIEF DESCRIPTION OF THE DRAWINGS

The above objectives and advantages of the present invention will become more apparent by describing in detail the preferred embodiment with reference to the attached drawings, in which.

DETAILED DESCRIPTION OF THE DRAWINGS

Figure 1:
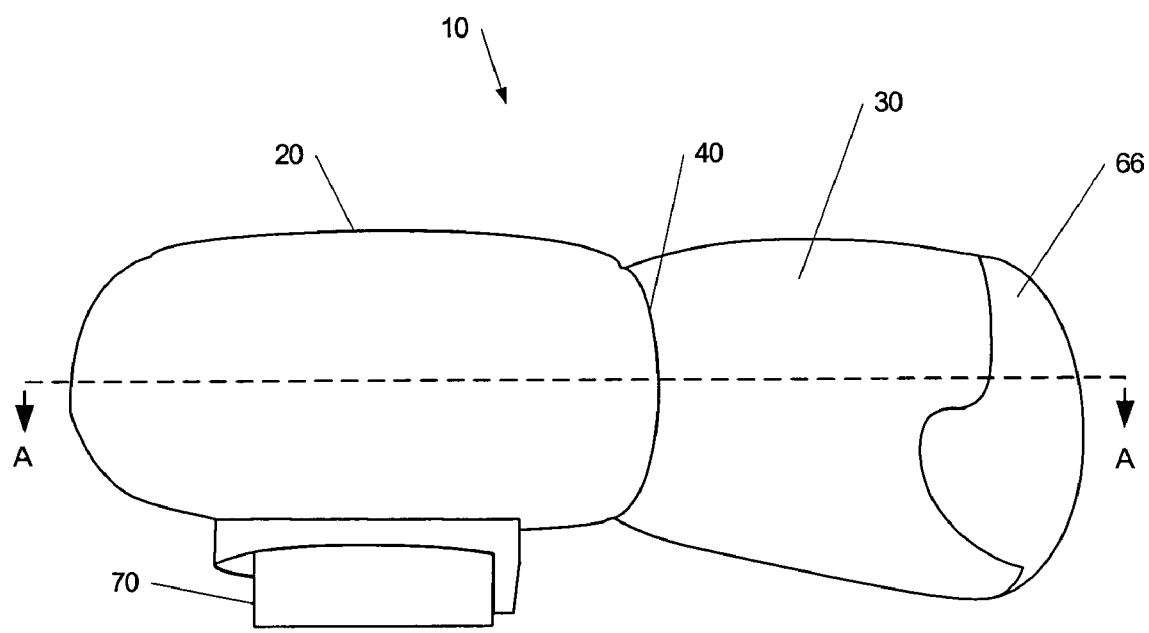
FIG. 1 shows a side view of the headlight.

FIG. 1 is a side elevation view of a safety headlight 10 that includes a main body 20 and a pivot body 30. The main body 20 and pivot body 30 are attached together by a pivot mechanism 40, which allows the pivot body 30 to be positioned by the user to direct light from the headlight 10 to a desired position. The light 10 includes a top face, a bottom face, two side faces, and a rear face. Attached to the bottom face is a mounting device 70 that allows attachment of the light 10 to a cycle through any secure means.

Figure 2:
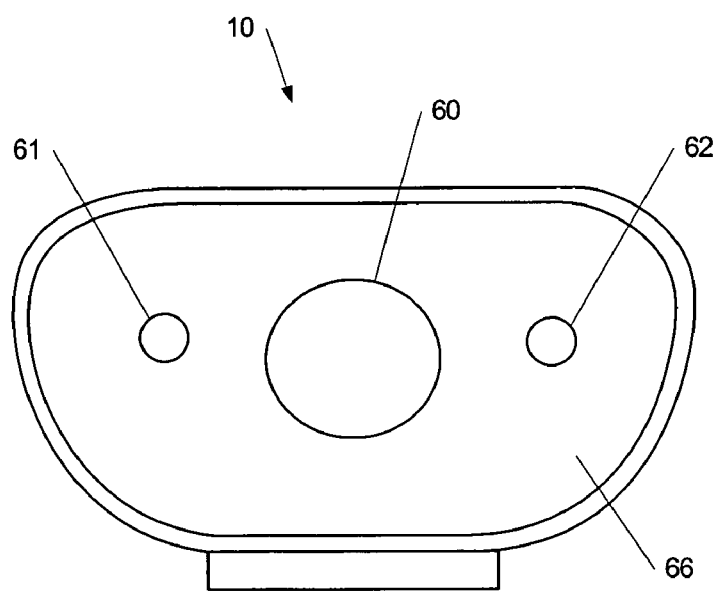
FIG. 2 shows a front view of the headlight including the bulb and LED bulb(s).

FIG. 2 is a front elevation view of the pivot body 30. The front of the pivot body houses a light bulb 60 and LED bulb(s) 61 and 62. Although the safety light is shown in the figures with two LED bulbs spaced from the main bulb 60, any number of LED bulb(s) in any position may be included as desired. The light bulb 60 can comprise a Halogen, Xenen, Krypton, or equivalent bulb. The bulb 60 and LED bulbs 61 and 62 are protected by a lens cover 66. The lens cover 66 as shown in FIGS. 1 and 2 covers the entire front portion of, and a portion of each side of, the pivot body 30. Although this configuration is preferred for the lens cover 66 to allow side visibility portals for light emission, the lens cover 66 can be formed so that it does not cover any portion of the sides of the pivot body 30 or can be formed to cover greater or lesser portions of the sides of the pivot body 30 than shown in the figures. Regardless of body surfaces covered, the lens cover 66 protects the bulb 60 and LED bulbs 61 and 62. The lens cover will typically also perform other functions, such as diffusing the emitted light.

Figure 3:
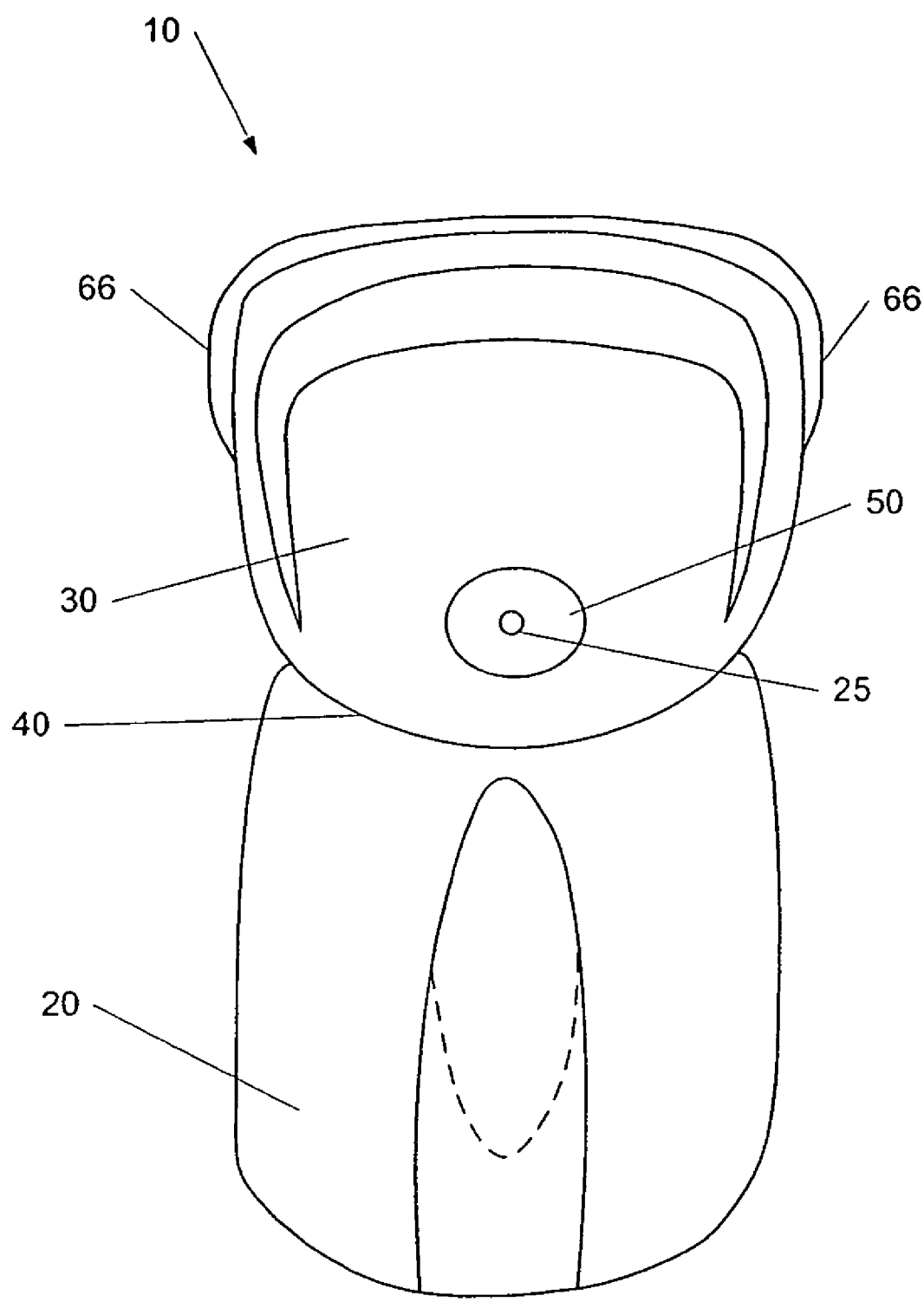
FIG. 3 shows a top view of the headlight including the switch.

FIG. 3 is a top plan view of the safety headlight 10 with main body 20, pivot body 30, and pivot mechanism 40. An activation button 50 is provided on the top portion of the pivot body 30. The activation button 50 is operable to switch the safety headlight 10 from a standby or off position with no bulbs illuminated and no battery power utilized, to an on or burn position with either the primary bulb or LED bulb(s) activated and battery power utilized. The activation button 50 may be pressed multiple times to switch from a standby mode, to a first mode where the bulb 60 is in a fully lit and the LED bulbs 61 and 62 are not illuminated, to a second mode where bulb 60 is half or dimly lit and the LED bulbs 61 and 62 are not illuminated, to a third mode where the bulb 60 is off and the LED bulbs 61 and 62 are continuously lit, to a fourth mode where the bulb 60 is off and the LED bulbs 61 and 62 are flashing, and finally back to the standby mode. The activation button 50 is shown as part of the pivot body 30, but could be housed on the main body 20. A mode indication light can also be provided to display the current mode (not shown).

Figure 4:
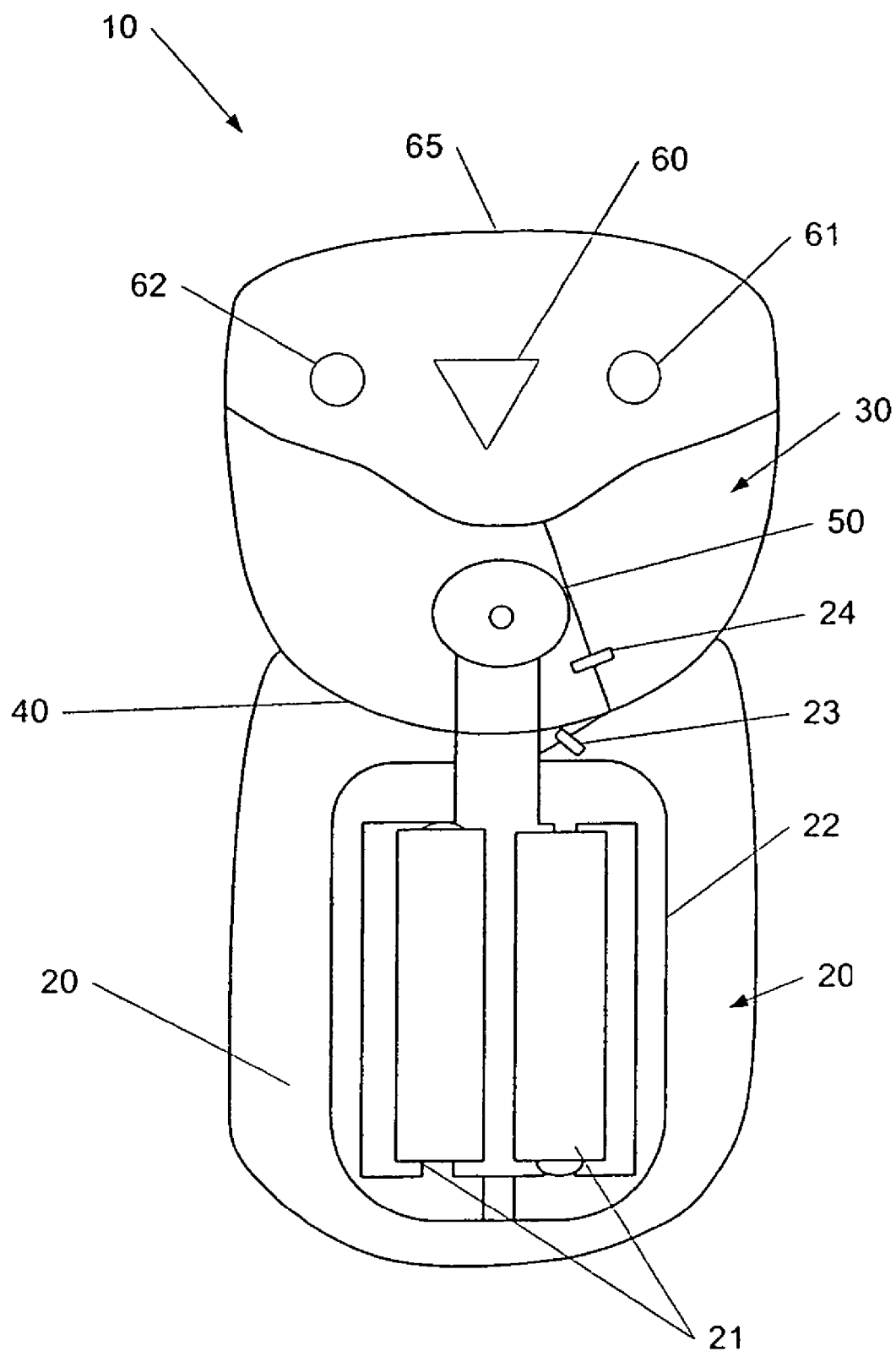
FIG. 4 shows an internal view of the safety light 10 along line A—A of FIG. 1.

FIG. 4 is an internal view of the safety light 10 along line A—A of FIG. 1. In FIG. 4, main body 20 is shown with a power compartment 22 that houses batteries 21. Although only two batteries 21 are shown, the safety headlight 10 can operate with any number or type of batteries as desired. The power compartment 22 is in communication with a power sensor 23, safety switch 24, and a low-power indicator light 25. After low-power indicator light 25 has been pressed and the safety light is operating either the bulb 60 or LED bulbs 61 and 62, the power sensor 23 monitors the remaining battery power. Upon sensing a lack of battery power, in this embodiment, indicated by a battery voltage less than 4 volts, the power sensor 23 communicates with the safety switch 24 to switch the safety light 10 into a lower battery power consumption mode. Typically, the safety light 10 is switched from supplying battery power to the bulb 60 to the LED bulbs 61 and 62, which use less power. The low power indicator light 25 is activated by the safety switch 24 when the power sensor 23 receives an indication from the power compartment 22 that the battery voltage has decreased to a specified level. In FIG. 3, the low-power indicator light 25 is shown in the central part of the activation button 50. The low-power indicator light 25 could be housed elsewhere on the pivot body 30 or could be housed on the main body 20.

Figure 5:
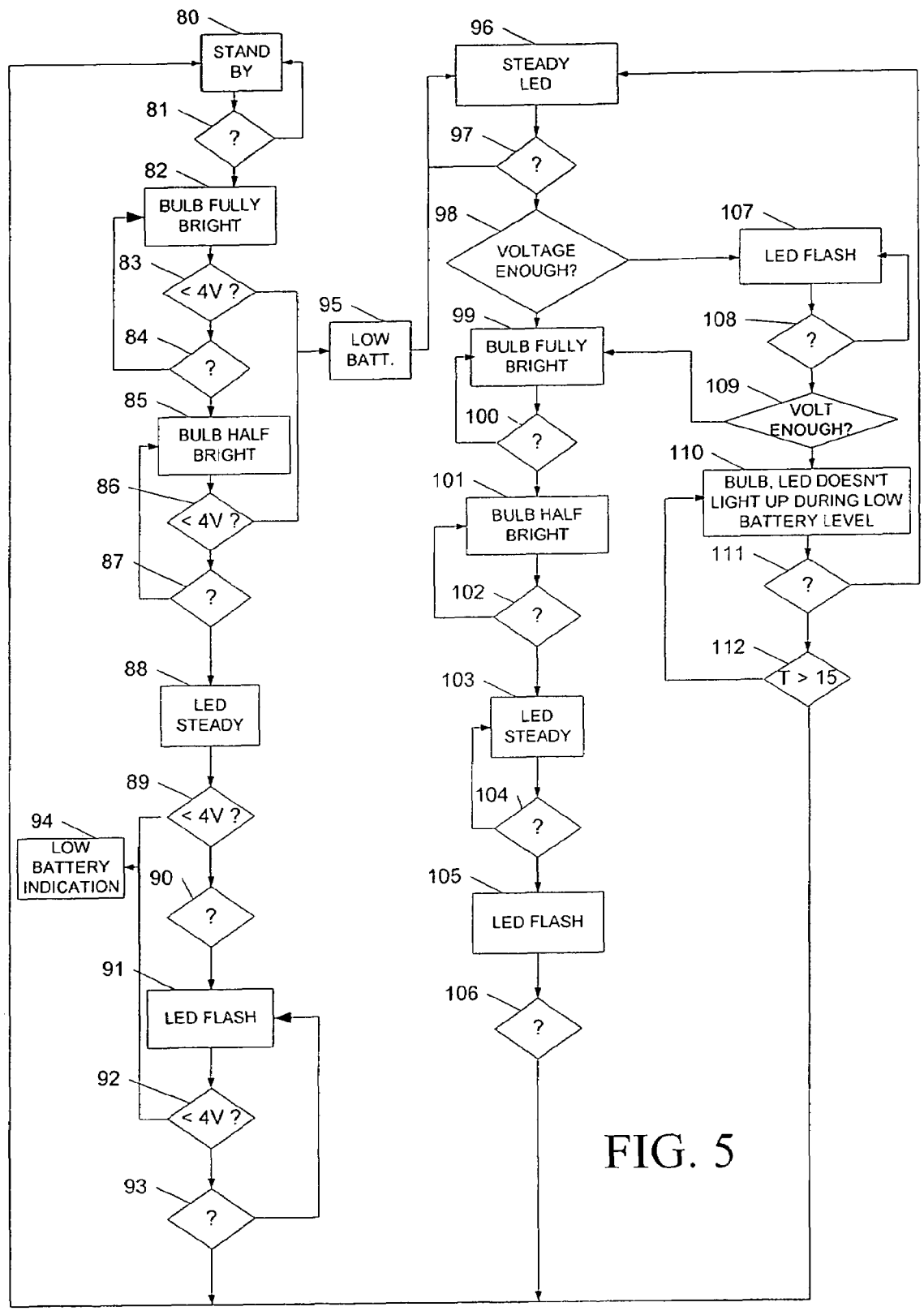
FIGS. 5, 5A, 5B, and 5C show a flowchart of the operation of the safety light.
Figure 5A:
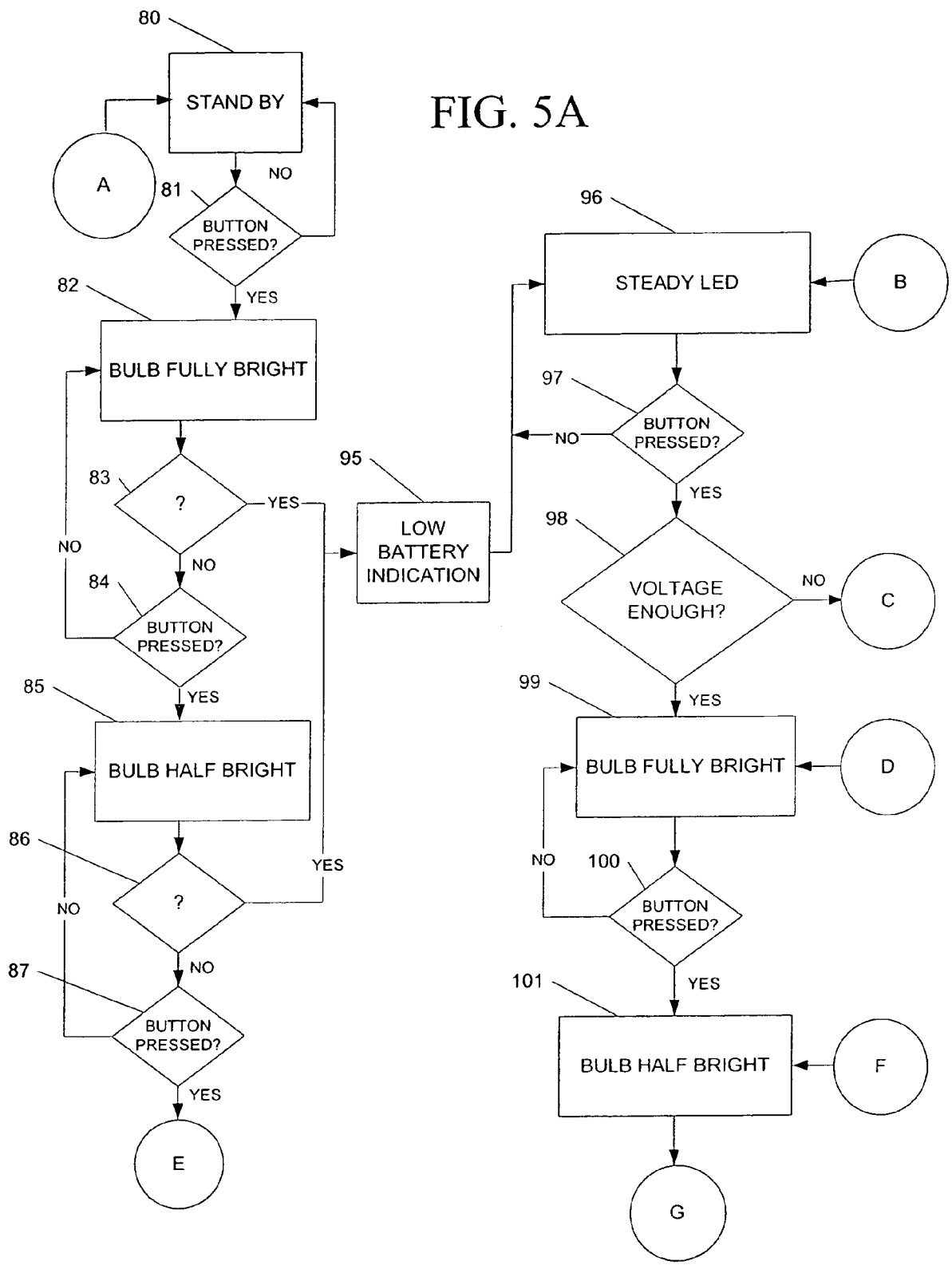
Figure 5B:
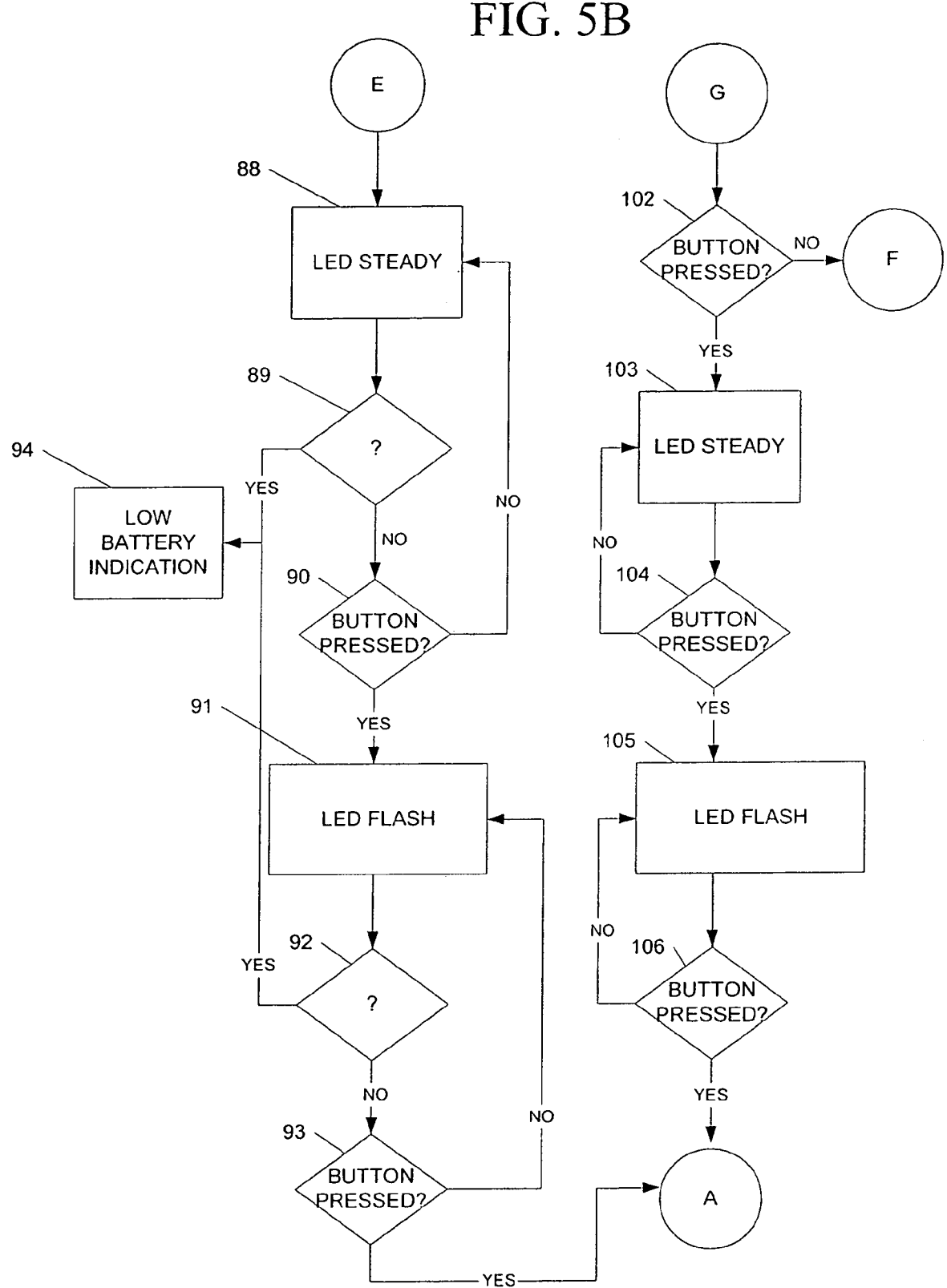
Figure 5C:
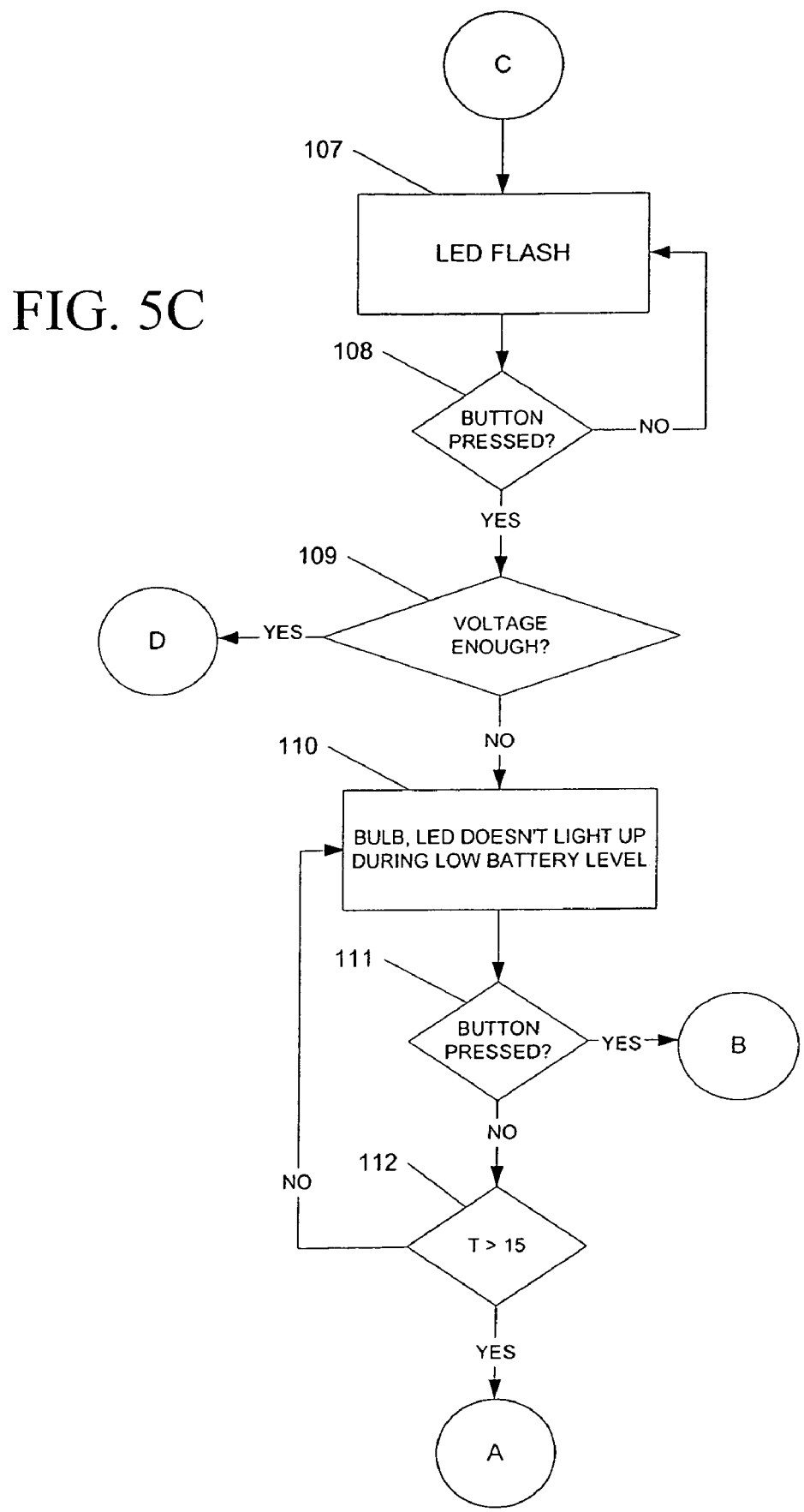

FIGS. 5, 5A, 5B, and 5C are a functional flowchart illustrating a preferred operation of the safety light. FIGS. 5A, 5B, and 5C are enlarged views of sections of the flowchart of FIG. 5. The process begins at step 80, in which the light is in standby mode. The process proceeds to decision block 81 to determine if the activation button has been pressed. If the activation button has not been pressed, the process returns to block 80 to standby mode. If the activation button has been pressed, the process proceeds to block 82 in which the bulb is fully illuminated. The process then continues to decision block 83 to determine if the battery voltage is greater than 4 volts, which indicates that available battery power is sufficient to sustain the bulb in fully illuminated mode. Although the necessary power can vary according to the type of bulb and battery used, the battery voltage typically should not be less than 4 volts to maintain the present operating mode. If the battery voltage is less than 4 volts, the process proceeds to the low battery indication loop, which will be described with reference to block 95. If the battery voltage is not lower than 4 volts, the process continues on to decision block 84.

In block 84, a decision is made whether the activation button has been pressed. If the activation button has not been pressed, the process returns to block 82 with the bulb fully bright and the process continues to block 83 as indicated above. If the activation button has been pressed, the process continues to block 85, where the bulb is reduced to half brightness. The process then continues to decision block 86 to decide whether the battery voltage is less than 4 volts. If the battery voltage is less than 4 volts, the process proceeds to the low battery indication loop, which will be described below with reference to block 95 with the low battery indicator lit. If the battery voltage is not less than 4 volts, the process continues to block 87 to decide if the activation button has been pressed. If the activation button has not been pressed, the process returns to block 85 with the bulb at half brightness and with the process continuing to decision block 86 as indicated above. If the activation button has been pressed in decision block 87, the process continues to block 88 with a steady illumination of the LED bulb(s).

The process then continues to block 89 to decide if the battery voltage is less than 4 volts. If the current battery voltage is less than 4 volts, then the process proceeds to block 94 to indicate a low battery condition. If the current battery voltage is not less than 4 volts, then the process continues to decision block 90 to decide if the activation button has been pressed. If the activation button has not been pressed, the process returns to block 88 and will continue to illuminate the steady LED bulb(s)arid proceed to decision block 89 as indicated above. If the activation button has been pressed, the process continues to block 91 to flashing LED bulb(s).

The process next proceeds to block 92 to decide if the battery voltage is less than 4 volts. If the voltage is less than 4 volts, the process proceeds to block 94 to indicate a low battery condition. If the battery voltage in decision block 92 is not less than 4 volts, the process continues to decision block 93 to determine if the activation button has been pressed. If the activation button has not been pressed, the system returns to block 91 with flashing LED bulb(s) and the process proceeds to block 92 as indicated above. If the activation button has been pressed, the safety light is switched back to a standby mode and the process returns to block 80.

When a low battery indication has occurred, the process proceeds to block 95. The process then continues to block 96 to operate the safety light with steady LED bulb(s). The process proceeds to block 97 to decide if the activation button has been pressed in an overriding manner (such as being held down for a certain period of time, pressed in a certain manner or number of times, etc.). If the activation button has not been pressed, the process returns to block 96 to continue to operate with steady LED bulb(s). If the activation button has been pressed in an overriding manner, the process continues to decision block 98 to determine if the battery voltage to the bulb is sufficient to burn the bulb fully bright. If the battery voltage is insufficient to burn the bulb fully bright, the LED BULB(S)is placed into a flashing position in block 107. If the battery voltage is sufficient to burn the bulb fully bright, the process continues to block 99 with the bulb fully bright. The process then continues to block 100 to decide if the activation button has been pressed. If the activation button has not been pressed, the process returns to block 99 with the bulb in fully bright operation. If the activation button has been pressed in decision block 100, the process continues to block 101 with the bulb half bright.

The process continues to decision block 102 to determine if the activation button has been pressed. If the activation button has not been pressed, the process returns to block 101 with the bulb half bright. If the activation button has been pressed in decision block 102, the process continues to block 103 with the LED bulb(s) in a steady illumination mode. The process then continues to decision block 104 to determine if the activation button has been pressed. If the activation button has not been pressed, the process returns to block 103 with the LED bulb(s) in a steady illumination mode. If the activation button has been pressed, the process proceeds to block 105 with the LED bulb(s) in a flashing mode. The process then continues to decision block 106 to determine if the activation button has been pressed. If the activation button has not been pressed, the process returns to block 105 with the LED bulb(s) in a flashing mode. If the activation button has been pressed, the process returns to standby mode at block 80.

If the battery voltage indicates insufficient power to maintain the bulb in a fully bright mode in decision block 98, the process proceeds to switch the safety light from a steady illumination mode to a flashing mode for the LED bulb(s) in block 107. The process then proceeds to block 108 to determine if the activation button has been pressed in an overriding manner. If the activation button has not been pressed, the process returns to block 107 with the LED bulb(s) in a flashing mode. If the activation button has been pressed in an overriding manner, the process continues to decision block 109 to determine if the battery voltage is sufficient to illuminate the bulb fully bright. If the battery voltage is insufficient to burn the bulb fully bright, the process proceeds to block 99 with the bulb fully bright and continues as described above. If the voltage is insufficient to sustain the bulb fully bright, the process continues to block 110 with the bulb and the LED bulb(s) in a non-operating position and with the low battery level indicator lit.

The process continues to block 111 to determine if the activation button has been pressed. If the activation button has been pressed, the process returns to block 96 with the LED bulb(s) steadily illuminated and continues as described above. If the activation button has not been pressed, the process continues to decision block 112 to determine if a predetermined time interval, 15 seconds in the preferred embodiment, have elapsed to return the safety light to the standby mode to conserve any remaining battery power. If 15 seconds have not elapsed, the process returns to block 110 with the bulb and the LED bulb(s) not lit and the low battery level indicated. If 15 seconds have elapsed, the process returns the safety light to standby mode to block 80 with neither the bulb, LED bulb(s), nor low battery indicator illuminated. When the process has returned to the standby mode as indicated at block 80, the safety light logic is reset and the entire process begins anew.

The process described herein allows a user to switch selectively from a fully bright bulb, to a half bright bulb, to steady burning LED bulb(s), and finally to flashing LED bulb(s). Additionally, the power sensor 23 operates to monitor the battery voltage to switch the safety light from illuminating the primary bulb to operating the LED bulb(s) to maintain a burning light as long as possible for safety. However, with reference specifically to block 109, the safety light allows a user to override the safety function to operate the primary bulb to drain the remaining power from the battery if desired. A user may choose to override the safety feature to illuminate a specific section of a path, to travel the remaining distance of a trip, or for any number of other reasons.

Figure 6:
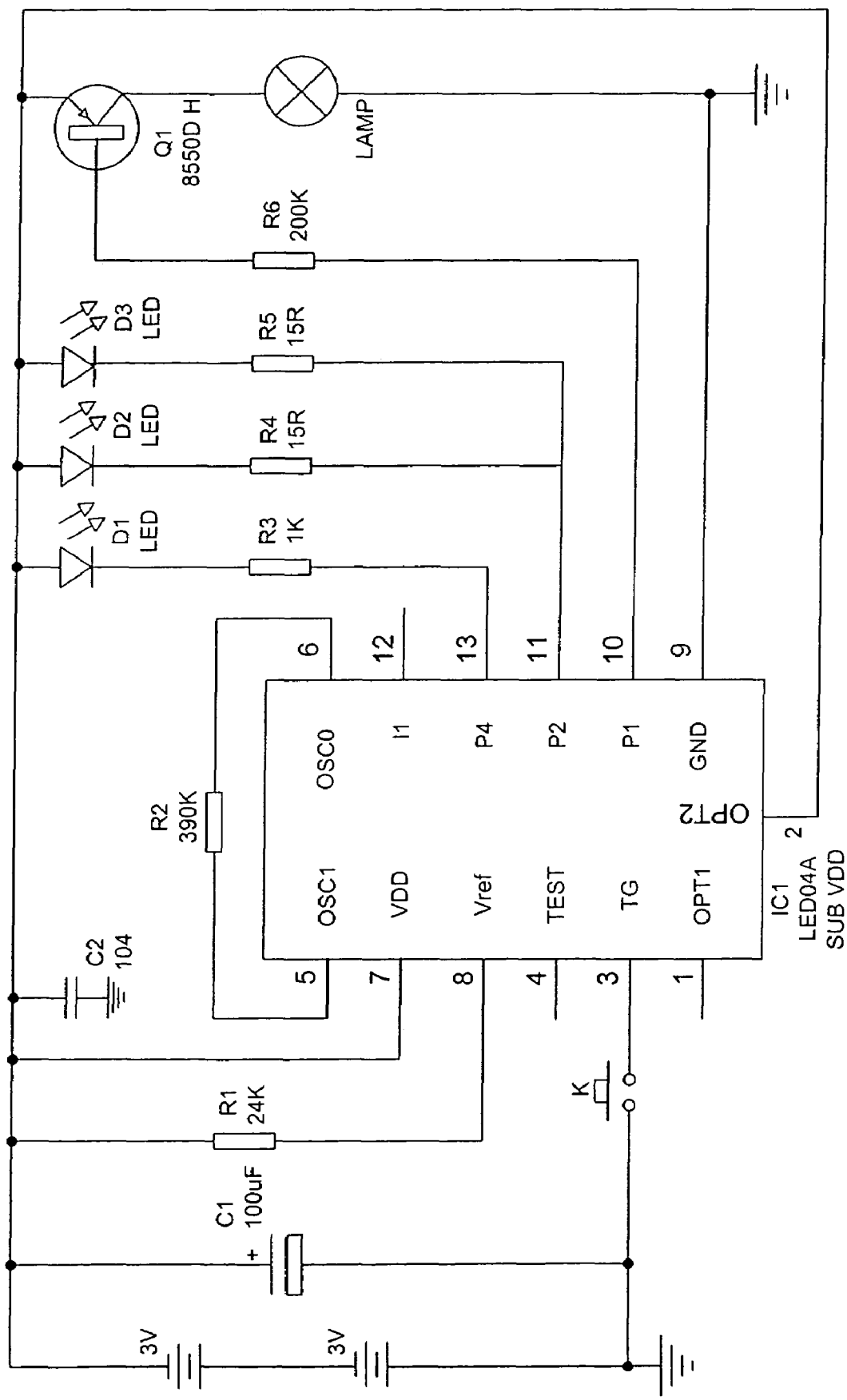
FIG. 6 shows a schematic diagram of the circuit for the safety light.

FIG. 6 shows an electronic schematic diagram illustrating one preferred embodiment of a circuit for implementing the processes described herein. This inventive circuit, designed by the assignee of the present invention (Bell Sports, Inc.), includes a microcontroller integrated circuit chip (IC1) that is programmed to carry out the steps of the process as illustrated in the functional flowchart of FIGS. 5, 5A, 5B, and 5C. The microcontroller chip IC1 in FIG. 6 has various pins including oscillator Inputs OSC1 and OSC2, operating voltage VDD and Reference Voltage Vref inputs, Trigger TG, Ground GND, Pinouts P1 through P4. and output ports OPT1 and OPT2. Since the operation of microcontrollers in general and this chip in particular are well understood by those skilled in the art, a detailed description of their operation is not called for and will not be provided herein. In general, however, the chip is connected to the LED bulb(s) and the primary bulb and can be programmed to activate and deactivate these bulbs as described herein. More specifically, as will be inherently conveyed to one of skill in the art by the electronic schematic of FIG. 6, the microcontroller IC1 is programmed to monitor the battery voltage, in this case of the two series connected 3 volt batteries on the left in FIG. 6. If the battery voltage falls below a preset level, the program dictates that Pinout P1 is set to turn off Transistor Q1, thereby deactivating the main lamp. At the same time, Pinouts P2 and P4 are grounded, which lights LEDs D1–D3, their brightness being determined by resistors R3, R4, and R5. The system can be manually triggered as described above with temporary switch K if desired.

It will be understood by those skilled in the art that while the present invention has been discussed with regard to preferred embodiments, various changes, additions, and modifications can be made thereto without departing from the spirit and scope of the invention.

What is claimed is:

1. A safety light comprising:
a housing containing a power source with an available power;
a primary bulb that operates with a first power and at least one LED bulb that operates with a second power lower than the first power;
and a sensor connected to the power source, the primary bulb, and the at least one LED bulb;
wherein when the sensor determines that the available power is inadequate to supply the first power, the sensor switches the safety light from operation of the primary bulb to operation of the at least one LED bulb.

2. The safety light of claim 1, wherein the first power is a minimum power required to maintain the primary bulb at full illumination.

3. The safety light of claim 1, wherein the safety light can be operated at half the first power to maintain the primary bulb at half illumination.

4. The safety light of claim 1, wherein the second power is a minimum power required to maintain the at least one LED at full illumination.

5. The safety light of claim 1, wherein the at least one LED can be operated in a flashing mode.

6. The safety light of claim 1, further comprising an activation button that can be activated to select between an off condition, a primary bulb operation condition, and an LED operation condition of the safety light.

7. The safety light of claim 6, wherein the primary bulb operation condition includes a fully illuminated bulb position and a half illuminated bulb position.

8. The safety light of claim 6, wherein the LED operation condition includes a steady LED position and a flash LED position.

9. The safety light of claim 6, wherein the activation button can be operated to override the automatic sensor switching from operation of the primary bulb to operation of the at least one LED bulb.

10. A method of operating a safety headlight having an electrical power source with an available power, a higher power light bulb, and a lower power light bulb, the method comprising:
supplying power from the power source to the higher power light bulb to light the higher power light bulb;
monitoring the available power of the electrical power source; sensor and
discontinuing automatically the supply of power to the higher power light bulb and supplying power to the lower power light bulb if the monitored available power falls below a pre-selected threshold.

11. The method of claim 10 wherein power source comprises at least one battery.

12. The method of claim 10 wherein the monitoring of the available power comprises measuring the voltage of the electrical power source.

13. The method of claim 10 and wherein safety headlight further includes an override switch, the method further comprising the steps of monitoring for activation of the override operable switch and, in response to a detected activation, changing the operational modes of the higher and the lower power light bulbs.

14. A method of claim 13 and wherein the step of changing the operational modes of the higher and lower power light bulbs includes switching the higher power light bulb from a higher brightness condition to a lower brightness condition.

15. A method for operating a safety light for a bicycle, the safety light including a housing containing a power source with an available power, a primary bulb that requires a first power and at least one LED bulb that requires a lower power than the first power, and a sensor coupled to the power source, the primary bulb, and the at least one LED bulb, the method comprising:
operating the primary bulb;
monitoring the available power by the sensor;
switching operation automatically from the primary bulb to the at least one the LED bulb when the available power falls below the first power.

* * * * *